No. 610,515. Patented Sept. 6, 1898.
F. C. BALL.
GLASS BLOWING MACHINE.
(Application filed Dec. 13, 1897.)

(No Model.) 5 Sheets—Sheet 1.

WITNESSES: INVENTOR
F. W. Woerner. Frank C. Ball,
J. A. Walsh. BY Chester Bradford,
ATTORNEY.

No. 610,515. Patented Sept. 6, 1898.
F. C. BALL.
GLASS BLOWING MACHINE.
(Application filed Dec. 16, 1897.)
(No Model.)

5 Sheets—Sheet 2.

WITNESSES:
F. N. Woemer.
J. A. Walsh.

INVENTOR
Frank C. Ball,
BY
Chester Bradford
ATTORNEY.

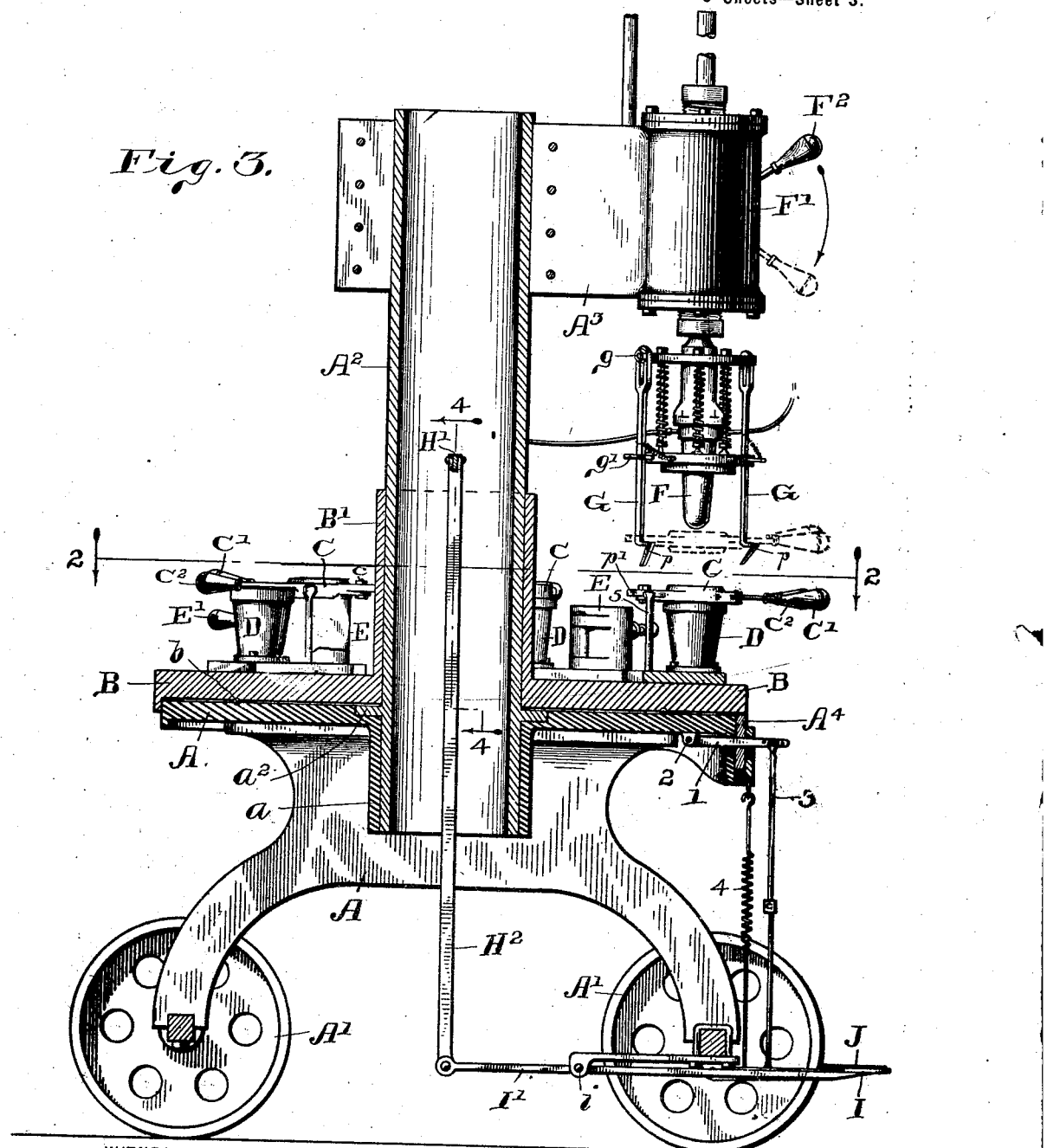

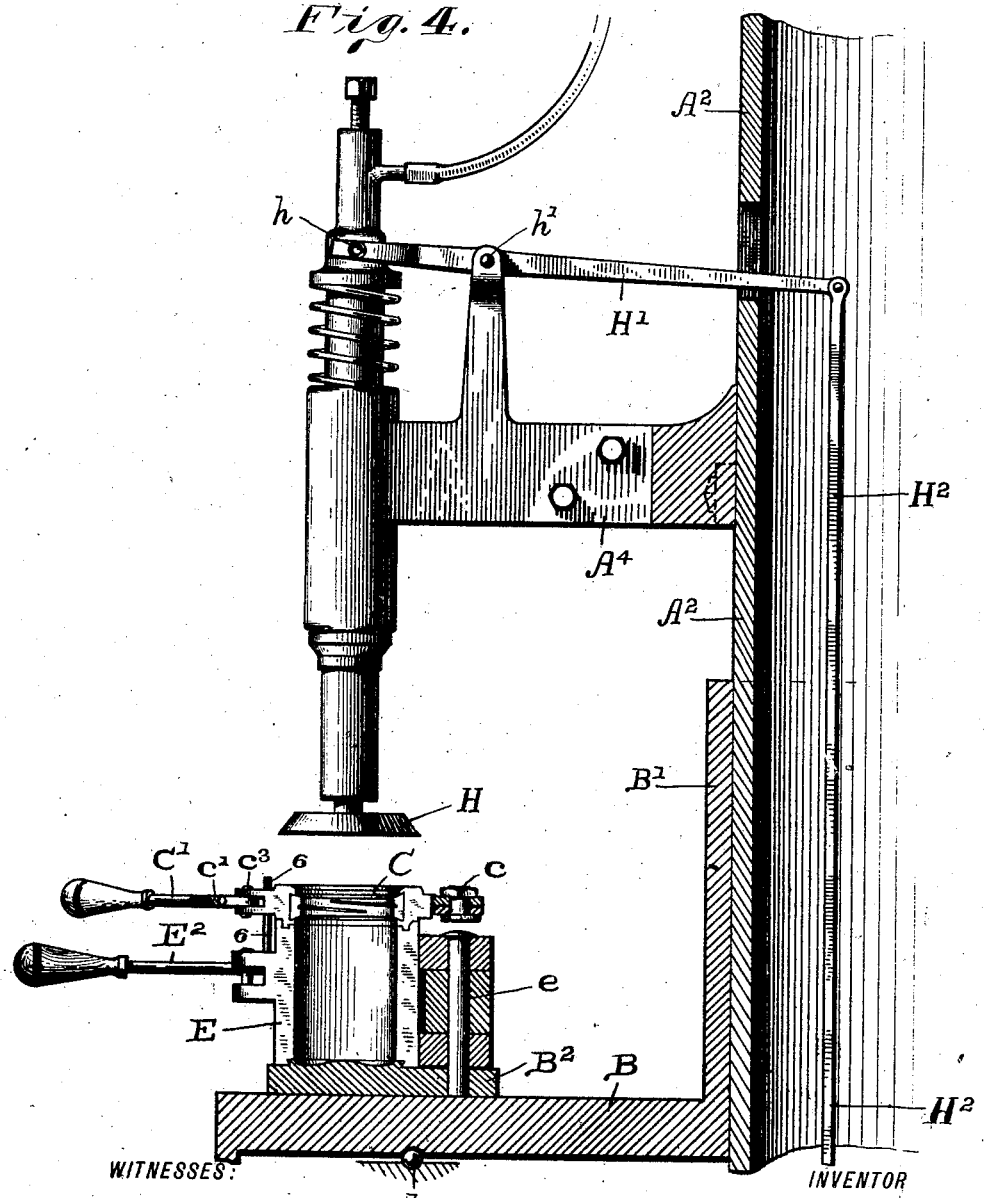

No. 610,515. Patented Sept. 6, 1898.
F. C. BALL.
GLASS BLOWING MACHINE.
(Application filed Dec. 16, 1897.)
(No Model.) 5 Sheets—Sheet 5.
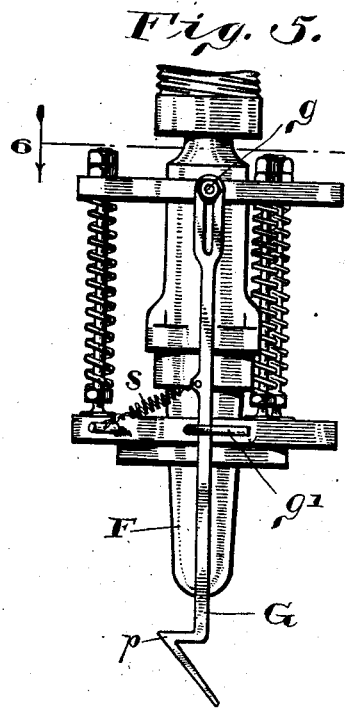
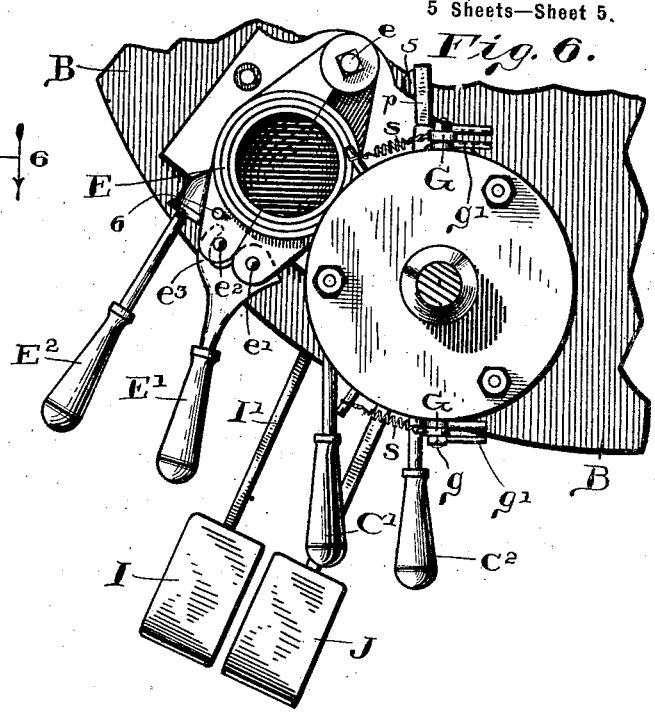
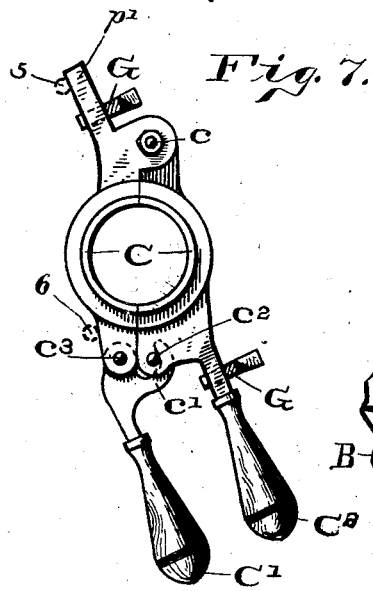
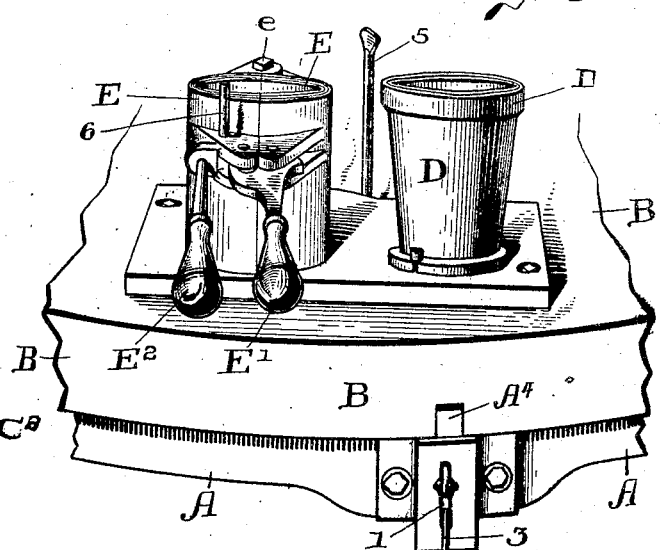
WITNESSES:
F. W. Woerner,
J. A. Walsh.
INVENTOR
Frank C. Ball,
BY Chester Bradford,
ATTORNEY.

UNITED STATES PATENT OFFICE.

FRANK C. BALL, OF MUNCIE, INDIANA, ASSIGNOR TO THE BALL BROTHERS GLASS MANUFACTURING COMPANY, OF SAME PLACE.

GLASS-BLOWING MACHINE.

SPECIFICATION forming part of Letters Patent No. 610,515, dated September 6, 1898.

Application filed December 16, 1897. Serial No. 662,182. (No model.)

*To all whom it may concern:*

Be it known that I, FRANK C. BALL, a citizen of the United States, residing at Muncie, in the county of Delaware and State of Indiana, have invented certain new and useful Improvements in Glass-Blowing Machines, of which the following is a specification.

My present invention consists in certain improvements in glass-blowing machinery, and relates especially to such a machine as is shown and described in Letters Patent of the United States No. 608,022, issued upon the application of Alvah L. Bingham July 26, 1898. I have illustrated a complete machine embodying my present improvements in order that the relation of the latter to the other parts of the machine may be clearly understood, and will incidentally and for purposes of clearness briefly generally describe such machine; but the detail description will principally relate to the parts involved in my present improvements.

Figure 1:
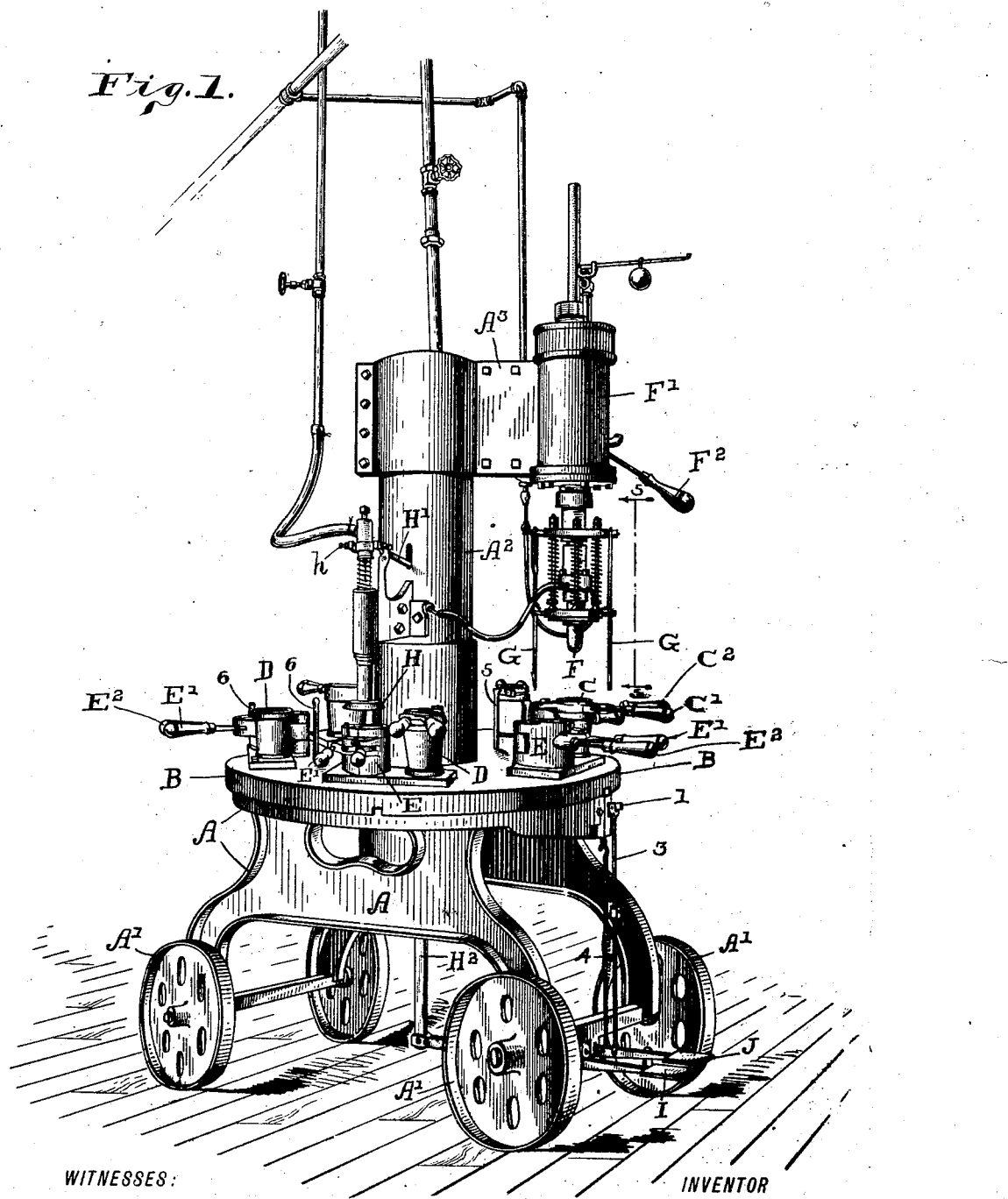
Figure 2:
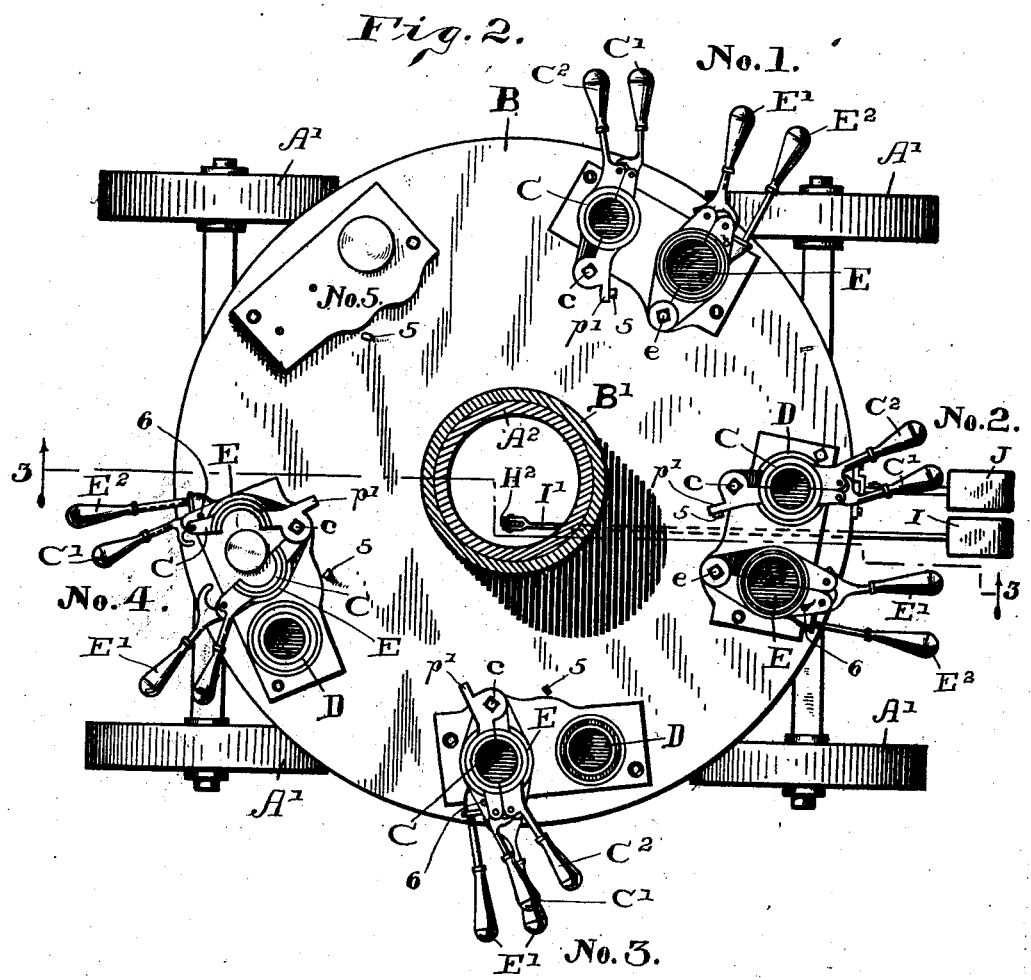

Referring to the accompanying drawings, which are made a part hereof and on which similar letters and figures of reference indicate similar parts, Figure 1 is a perspective view of a glass-blowing machine provided with the improvements which constitute my present invention; Fig. 2, a horizontal sectional view through the standard of the machine and above the table and pressing and blowing molds, as seen from the dotted line 2 2 in Fig. 3, showing said molds in plan in various conditions; Fig. 3, a vertical sectional view as seen from the dotted line 3 3 in Fig. 2; Fig. 4, a detail view showing the blowing-head and the lever for operating the same in elevation and also showing one-half a blowing-mold and a neck-forming mold in the position they occupy when ready for the operation of the blowing-head; Fig. 5, a detail side elevation of one of the pressing-heads (including the plunger or head proper) and the attached hooks or mold-lifting devices separately as seen from the dotted line 5 5 in Fig. 1; Fig. 6, a detail plan view as seen from the dotted line 6 6 in Fig. 5 and also showing in plan the parts below those shown in Fig. 5; Fig. 7, a plan view of a neck-forming mold separately; and Fig. 8, a detail perspective view showing a pressing-mold, a blowing-mold, and the adjusting-stops by which the neck-forming mold (not shown in this figure) is brought accurately to position when placed upon said molds.

In said drawings the portions marked A represent the frame of a machine suitable to contain my improvements; B, a rotating table thereon; C, the neck-forming molds; D, the pressing-molds; E, the blowing-molds; F, the plunger or perforator whereby an opening or perforation is formed in the mass of plastic glass; G, hooks carried by the plunger-head for lifting the neck-molds; H, the blowing-head; I, a treadle for operating said blowing-head, and J a treadle for operating the latch or detent by which the rotating table is held to the proper positions.

The frame A is preferably a heavy metallic frame of suitable form and construction and is shown as mounted on heavy trucks or wheels A'. Centrally a rigid hollow stem or standard $A^2$ extends up therefrom, which is supported by a collar $a^2$, seated in the frame A, and by a sleeve-like extension $a$, extending down from the bed-plate of the frame A. Upon the standard $A^2$ are brackets $A^3$ and $A^4$, which carry the plunger and the blowing-head, respectively, and the operating devices therefor.

The table B is suitably mounted on the bed-plate of the frame A, preferably on balls $b$, placed in a suitable ball-race between them, and is adapted to revolve around the standard $A^2$, being, as is clearly shown in several of the figures, provided with a suitable sleeve B', which extends up a considerable distance and surrounds the adjacent portion of said standard. On this table are mounted the series of molds heretofore referred to, which in the arrangement shown consists of five of each variety, or five sets. The table B is adapted to be revolved as the work proceeds and to be accurately stopped from time to time at the proper points. There are as many notches in the edge or rim of this table as there are sets of molds. Mounted in the bed-plate of the frame A adjacent to said rim or edge is a latch or detent $A^4$, which is operated by means of the treadle J. In detail the construction of detent-controlling mechanism shown consists of a lever 1, which is pivoted at 2 to the under side of the bed-plate of the frame A and passes out through a slot in the housing and through the latch A⁴ (which is perforated to receive it) to the outside of the machine. Here it is connected to a rod 3, which runs down to the treadle J. The latch is held into engagement by a spring-support 4, connected at one end to the treadle-arm and at the other end to the frame of the machine. When the treadle is depressed, the latch is drawn out of the notch in which it is at the time, and the table is free to be revolved. The treadle may be immediately released, as the latch or detent A⁴ will run easily along the under side of the table-rim until the next notch therein is reached, into which when reached it will promptly enter, being impelled by the spring 4.

The neck-molds C are each composed of two parts connected together by a hinge-pivot $c$ and are adapted to rest upon and form a continuation of both the pressing-molds D and the blowing-molds E, first of one and then of the other. The adjacent surfaces of these molds where they come together have an annular ring-and-groove formation, by which their operative surfaces are brought into proper relation vertically, as shown in Fig. 4. It is also necessary that the neck-molds be brought into proper relation horizontally with the other molds, especially with the blowing-molds E, as otherwise it would be impossible to open said molds (in their present and preferred construction) without destroying or distorting the article being formed. I have therefore provided a stud or projection 5 adjacent to the mold B, into contact with which the projection $p'$ on said mold C can be thrown and the desired position of the said molds C thus quickly and easily secured. I have also provided a similar stud or projection 6 upon the mold E, which likewise serves as a guide and stop for the mold C when placed thereon. This latter is so arranged that when the molds C and E are together the pivot-points are vertically in line with each other and the molds divide on the same vertical plane, so that after the article has been formed and when it is desired to remove it from said molds they may open together as though they were a single mold. The interior surfaces of these neck-molds are shaped to give the desired form to the exterior of the neck of the glass article to be formed in the machine. The machine shown is constructed to form a variety of fruit-jars designed for screw-caps, and consequently the neck-molds have inclined grooves which form appropriate screw-threads upon the outside of the necks of the jars to enable such caps to be suitably connected to the finished jars. The two main parts forming these neck-molds are secured together by pivots $c$, and each one is provided with suitable handles C' and C², by which the parts may be manipulated as desired. One of these handles has a suitable hook $c'$, which engages with a corresponding stud $c^2$ on the other, thus locking them together. The handle C' is pivoted at $c^3$, while the handle C² is rigid, as shown. The operation is obvious. The projection $p'$ is substantially opposite the base of the stiff handle C², and the points $p$ of the hooks G engage with these two points, as best shown in Fig. 7, and thus the neck-molds are substantially balanced thereon.

The pressing-molds D are cup-like in form and are secured fixedly at proper points on the table B. They are adapted to receive a suitable quantity of molten glass to form one of the articles being made and, in connection with the plunger F and neck-molds C, give it its initial shape.

The blowing-molds E are, like the neck-molds E, each composed of two parts. As best shown in Fig. 4, these are pivoted together by a pivot $e$, and the whole mold is rigidly secured to the table B. For convenience sake I have shown each set of these molds D and E as having a common base B², which base is rigidly secured to the rotating table B and so far as any operation is concerned might be integral with said table. The two halves of the blowing-mold are provided with handles E' and E², and one of said handles is pivoted at $e'$ and is provided with a suitable engaging hook $e^3$, which engages with a pin or stud $e^4$, whereby the mold-halves can be locked together when in operative position and be disengaged and separated when it is desired to remove the article which has been formed therein.

The plunger F is of suitable size and shape to enter the mass of molten glass in one of the pressing-molds D and give it its initial form. It is operated by a piston contained within the cylinder F', which cylinder is carried by the bracket A³ on the standard A². As the particular construction of this plunger and of the means for operating it is not peculiar to my present invention, it will not be further described herein. A similar construction is shown in Letters Patent No. 608,022 above referred to.

The hooks G are shown as suspended from a suitable point on the head carrying the plunger F and are adapted as said plunger descends to pass beneath the neck-mold C and by reason of their formation (best shown in Fig. 5) to engage with said neck mold or ring, so that as the plunger reascends it will by means of the hooks automatically lift said neck-mold and the partly-formed glass article carried thereby up out of and free from the pressing-mold D. As shown especially in Fig. 5, the shanks of these hooks have slots at their upper ends, through which pass the studs or pivots $g$, by which the hook structures are carried. Movement of these structures in one direction is prevented by the keepers $g'$. Light springs $s$ tend to hold the shanks of said hooks against the stops formed by the ends of said keepers and when the hooks are forced backwardly against the stress of said springs to return them quickly to position when the force ceases or is removed. This arrangement is intended to keep the hooks generally in the position shown in Fig. 5, while permitting them to be moved from that position by the application of very slight force. The result is that when the inclined lower sides of the hooks strike the sides of the neck-molds said hooks are permitted by said springs to swing backwardly easily until the points $p$ of the hooks are below said molds, when, under the impulse of the springs $s$, they swing to beneath said neck-molds ready to engage with and lift them. A portion of molten glass and a neck-mold are not heavy; but the plunger forces the molten glass tightly against the interior of the pressing-mold, so that it requires considerable force to remove it, greater than can be conveniently applied manually. These hooks accomplish this lifting and relieve the operative of a considerable amount of arduous work. As they are connected to and move with the plunger, they also serve to perform this work at exactly the right instant of time. The hooks being entirely open upon one side and preferably with flat tops or engaging surfaces, as shown, the operative is enabled to easily remove the ring carrying the mass of partly-formed glass and deposit the same on the adjacent blowing-mold by hand with but little effort. By my arrangement, therefore, I secure that the most difficult portion of the work of transferring the partly-formed article from one mold to the other shall be performed automatically and by the machine, while not in the least interfering with the manual manipulation necessary to the proper carrying out of the work.

I have shown what I conceive to be the most desirable construction, arrangement, and means for operating this lifting apparatus; but obviously such construction, arrangement, and means for operating may be varied from without departing from my invention.

The blowing-head H is not in itself peculiar to my present invention and in general construction is similar to that shown in said Letters Patent No. 608,022. It is arranged above and adapted to be seated upon the blowing-molds when the same are completed by the placing of the neck-molds thereon. I have, however, provided a new means of operating the same. A lever H', pivoted at $h'$, is provided with engaging points $h$, which engage with the stem carrying the blowing-head. Said lever extends through a slot to within the hollow stem or standard $A^2$, where it is connected with a rod $H^2$, which extends down to and connects with the arm I' of the treadle I. The treadle-arm I' is pivoted at $i'$ and extends out to a convenient point where said treadle can be manipulated by an operative. The treadles I and J are preferably close alongside each other, where they can be easily attended to by the same person, which is a considerable advantage, although they may be located at different points.

The operation of this machine may be briefly described as follows: Referring now to Fig. 2, that operative known as the "gatherer" lifts a quantity of molten glass of the proper consistency from the furnace and deposits it in the pressing-mold which is at the time at the point marked No. 1. A neck-forming mold or ring has of course been placed upon said pressing-mold previously. The machine-operator, who stands at the point marked No. 2, cuts off a suitable quantity from this mass of glass. He then depresses the treadle J, unlatching the latch $l$, and whirls the table around until the said pressing-mold is brought below the plunger, which is directly before him. He then (in the construction shown, by means of the valve-lever $F^2$) causes the plunger F to operate, which, together with the neck-forming mold C, forms the neck of the article and also forms a perforation or cavity within the mass of glass below it, forcing said mass out into contact with the interior of the pressing-mold. He then reverses the plunger-operating apparatus, thus raising the plunger, which also, through the hooks G, raises the neck-mold and the partly-formed glass article. By this time a second mass of molten glass has been deposited in a pressing-mold at point No. 1. The operator then removes the neck mold or ring from the hooks G and deposits it on top of that blowing-mold which is alongside the pressing-mold from which it has just been removed. The machine-operator again depresses the treadle J and again revolves the table, moving the partly-formed article around to the blowing-mold at the point No. 3, at the same time bringing the mass of freshly-deposited molten glass from the point No. 1 to the point No. 2. He then simultaneously (or approximately so) depresses the treadle I, forcing down the blowing-head into contact with the neck-mold C at the point No. 3, the air from which blowing-head expands the article being formed to against the interior of the blowing-mold, giving it the designed shape, and operates the plunger F at the point No. 2. These operations complete the one article and partially form a second. At the third operation the completed article goes to the point No. 4 and still another article is added to the series. The completed article is either removed at the point No. 4 or allowed to cool until it reaches the point No. 5, where in the latter case it is removed, and the neck-forming mold is in either case transferred from the blowing-mold to the pressing-mold ready to receive a fresh charge of molten glass.

Having thus fully described my said invention, what I claim as new, and desire to secure by Letters Patent, is—

1. The combination, in a glass-blowing apparatus, of neck-molds, pressing-molds, blowing-molds, a blowing-head, and a pressing head or plunger, suitably arranged in relation to each other, hooks adapted to engage with the neck-molds and lift the same from the pressing-molds, and means for operating said hooks.

2. The combination, in a glass-blowing machine, of neck-molds, pressing-molds and blowing-molds arranged in sets on a suitable table, a vertically-movable plunger arranged above the pressing-molds and adapted to press the glass therein, and hooks carried by the plunger-head and adapted to engage with a neck-mold and lift the same from the corresponding pressing-mold as said plunger reascends, from whence said neck-mold is adapted to be transferred to a blowing-mold by hand.

3. The combination, in a glass-blowing apparatus, of neck-molds, pressing-molds, blowing-molds, a plunger arranged above the pressing-molds and adapted to press the glass therein, hooks adapted to engage with a neck-mold and lift the same from the pressing-mold, and means actuated from the plunger for operating said hooks.

4. The combination, in a glass-blowing machine, of a neck-mold, a plunger, hooks G carried by the plunger-head and adapted to engage with and lift said neck-forming mold, and springs s by which said hooks are normally held to a predetermined position, while adapted to be moved therefrom by contact with the part to be lifted thereby.

5. The combination, in a glass-blowing machine, of a pressing-mold, a blowing-mold, and a neck-mold adapted to be transferred from the pressing-mold to the blowing-mold, said blowing-mold and said neck-mold being each composed of parts hinged together, and a suitable stop or guide whereby said neck-mold is enabled to be easily positioned accurately upon said blowing-mold.

6. The combination, in a glass-blowing machine, of a blowing-mold composed of parts united by a vertical hinge-pivot, a neck-mold also composed of parts united by a vertical hinge-pivot and adapted to be placed upon said blowing-mold, the contacting surfaces of said molds having a ring-and-groove formation whereby they are brought into proper vertical relation with each other, and a stud or stop on said blowing-mold with which one side of said neck-mold is adapted to be brought into contact, whereby the hinge pivots are caused to assume a position in line with each other, substantially as and for the purposes set forth.

7. The combination, in a glass-blowing machine, of a suitable framework, a rotating table thereon, a series of sets of molds each composed of a pressing-mold and a blowing-mold arranged alongside each other and attached to the table and a neck-mold transferable from one to the other, a pressing-head, and a blowing-head, carried by a standard of the frame, means for transferring the neck-mold from a pressing-mold to a blowing-mold, and means for rotating the table and for stopping the same in predetermined positions, said stops, pressing-heads and blowing-heads being so arranged, relatively to each other, that when a pressing-mold is below the pressing-head a blowing-mold is below the blowing-head, substantially as shown and described.

8. The combination, in a glass-blowing machine, of a suitable framework having a central standard, a rotating table mounted thereon, a series of pressing, blowing and neck-forming molds carried by said table, a pressing-head and a blowing-head carried by said standard, means for operating said pressing-head, and means, consisting of a treadle I, a lever H' and suitable connecting-rods, for operating said blowing-head, substantially as set forth.

9. The combination, in a glass-blowing machine, of a suitable framework having a central standard, a rotating table mounted thereon, a series of pressing, blowing and neck-forming molds carried by said table, a pressing-head and a blowing-head carried by said standard, a suitable detent for locking said table at various points, a treadle for operating said detent, and a lever and a treadle for operating said blowing-head, said two treadles being located alongside each other, whereby they may be conveniently operated from a single point, substantially as shown and described.

10. The combination, in a glass-blowing apparatus, of neck-molds, pressing-molds, blowing-molds, a blowing-head, and a pressing head or plunger, suitably arranged in relation to each other, means adapted to engage with the neck-molds and lift the same from the pressing-molds, and mechanism for operating said lifting means, substantially as set forth.

In witness whereof I have hereunto set my hand and seal, at Indianapolis, Indiana, this 9th day of December, A. D. 1897.

FRANK C. BALL. [L. S.]

Witnesses:
CHESTER BRADFORD,
JAMES A. WALSH.